April 2, 1957 C. M. GLADIS 2,787,202
DEEP TILLAGE CHISEL AND COLTER FOR TRACTOR HITCHES
Filed Aug. 27, 1952 3 Sheets-Sheet 1

INVENTOR.
Cyril M. Gladis.
BY
Christy Parmelee & Strickland
ATTORNEYS

April 2, 1957   C. M. GLADIS   2,787,202
DEEP TILLAGE CHISEL AND COLTER FOR TRACTOR HITCHES
Filed Aug. 27, 1952   3 Sheets-Sheet 2
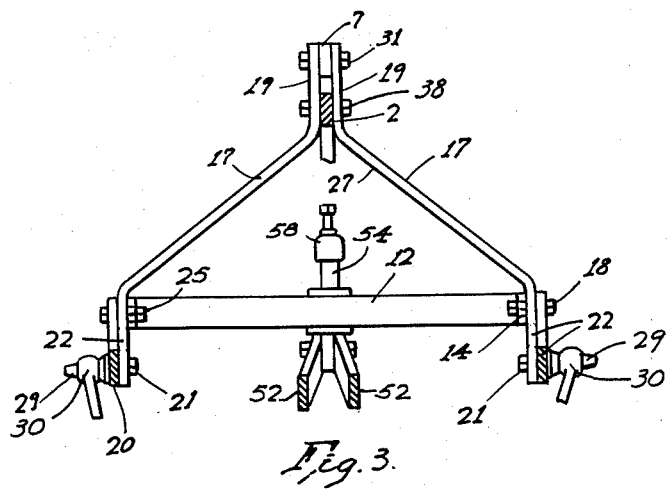
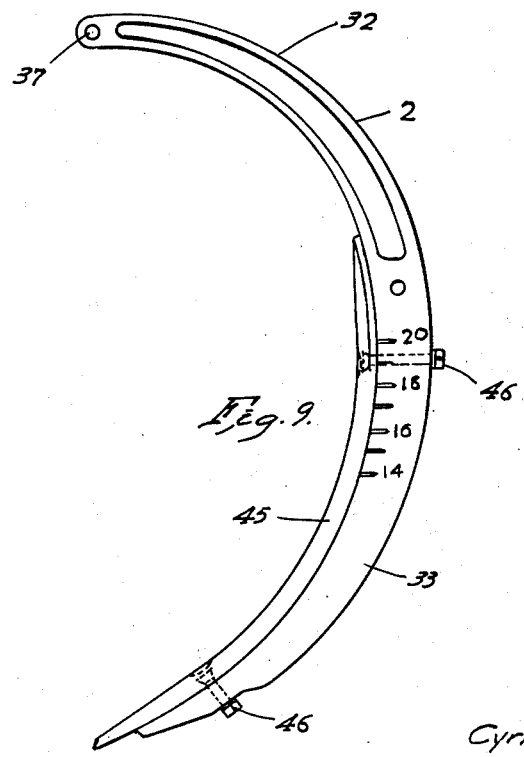
INVENTOR.
Cyril M. Gladis.
BY
Christy Parmelee & Strickland
ATTORNEYS

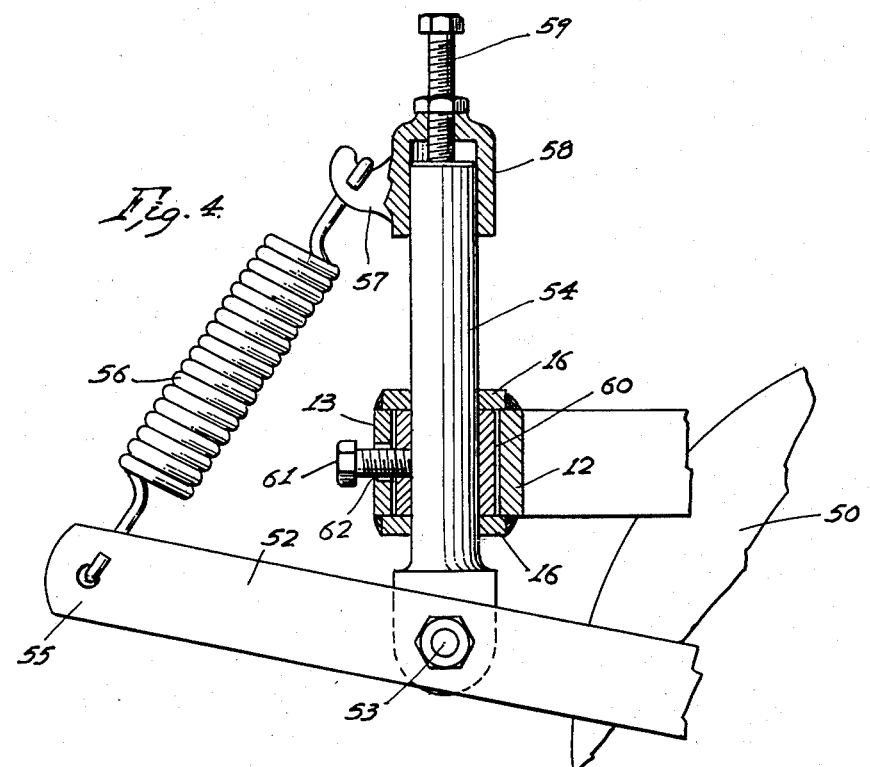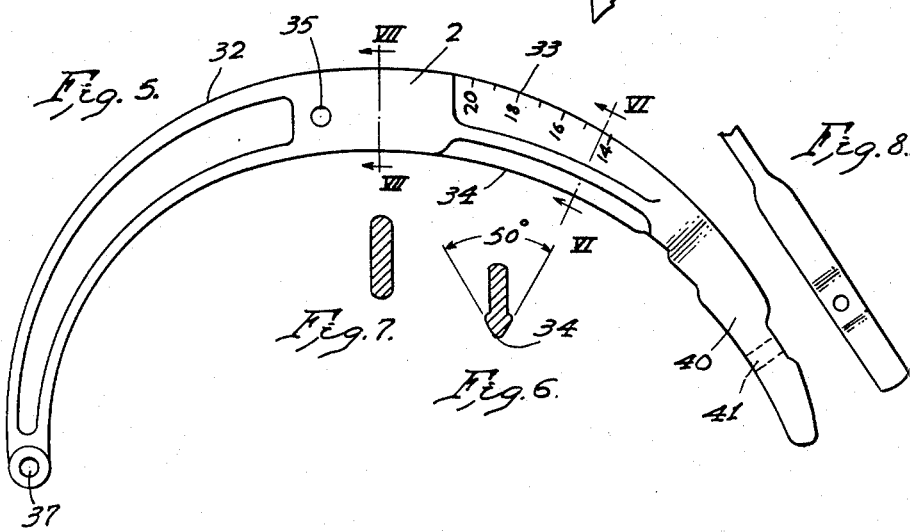

United States Patent Office 2,787,202
Patented Apr. 2, 1957

2,787,202

DEEP TILLAGE CHISEL AND COLTER FOR TRACTOR HITCHES

Cyril M. Gladis, Aliquippa, Pa., assignor to Pittsburgh Forgings Company, Coraopolis, Pa., a corporation of Delaware Application August 27, 1952, Serial No. 306,639

4 Claims. (Cl. 97—47.62)

This invention relates, as indicated, to a deep tillage ground-engaging instrument in the nature of a chisel having a swivelling and vertically adjustable colter for cutting sod ahead of the chisel, and, more particularly, to an apparatus of this character which is especially adapted for use with a three-point tractor hitch.

The chisel with which this invention is concerned is an implement which penetrates the earth to a depth of 18-20 inches for fracturing plow sole, the artificially formed impervious layer of soil resulting from packing of the soil in a layer beneath plow share depth. The implement is also used to fracture hard pan which is a naturally occuring clay layer found beneath tillable soil in some areas of the country, and may be used generally to open and aerate, or drain soils which are underlain by structures which tend to be impervious to root and moisture penetration.

The ground-engaging implement of this invention is substantially semi-circular or crescent shaped and has a centrally located draft connection about which it may fulcrum or pivot. Its upper end is provided with a connection to its supporting frame-work for transmitting reaction forces due to the movement of its lower end through the ground. The supporting framework, in a manner to be described, secures the center fulcrum connection and the upper connection of the implement respectively to the draft links and the compression link of a conventional three-point tractor hitch of the type commonly employed for raising and lowering ground-engaging tools to and from operable working positions with respect to the ground.

The mounting frame, in addition to providing a connection between the ground-engaging implement and the tractor, carries a swivelling and vertically adjustable colter for cutting the sod ahead of the chisel. In a manner to be described, the crescent shape of the chisel provides a space in which the colter wheel is operatively positioned and in which it may swivel with respect to the path of the travel of the tractor.

The objects and advantages of the invention will become apparent from the following description.

In the drawings there is shown a preferred embodiment of the invention. In this showing:

Fig. 3 is a sectional view taken substantially along the line III—III of Fig. 1;

Fig. 4 is an enlarged fragmentary sectional and elevational view illustrating in detail the colter mounting structure;

Fig. 5 is a detail showing of the ground-engaging tool of Fig. 1 removed from the connecting frame;

Fig. 6 is a sectional view taken along the line IV—IV of Fig. 5;

Fig. 7 is a sectional view taken substantially along line VII—VII of Fig. 5;

Fig. 8 is a fragmentary elevational view of the lower end of the ground-engaging tool looking from the right of Fig. 5; and Fig. 9 is a detail view similar to Fig. 5 showing a modified form of ground-engaging tool.

Figure 1:
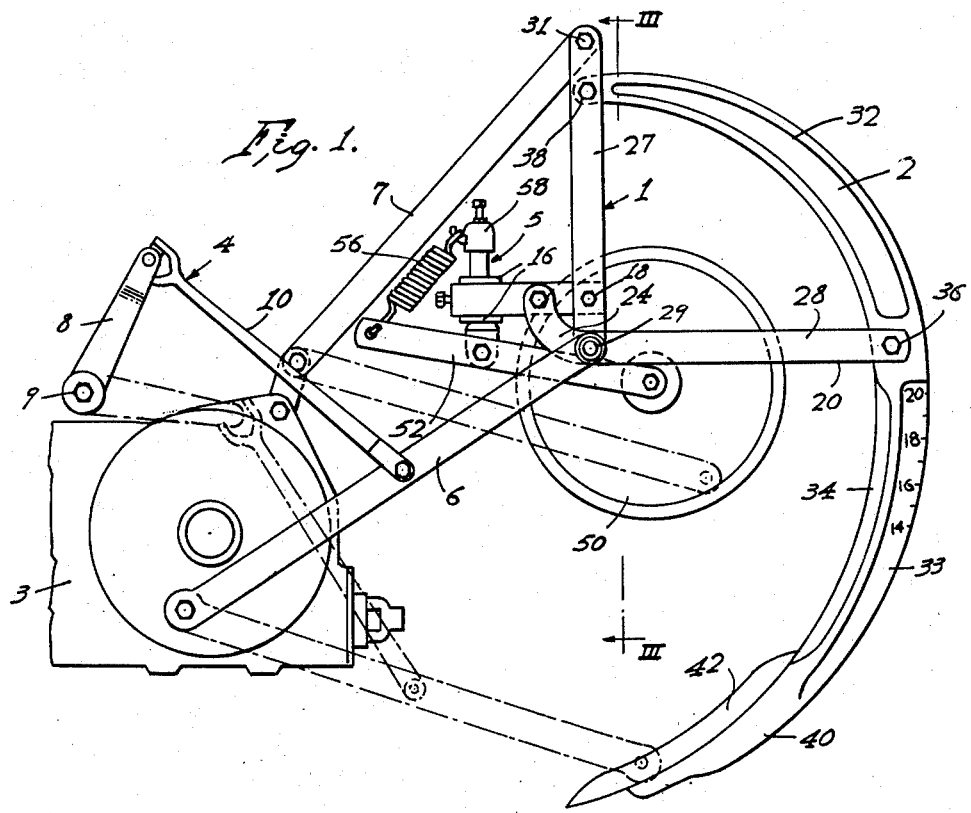
Fig. 1 is a side elevational view of a preferred embodiment of the invention.
Figure 2:
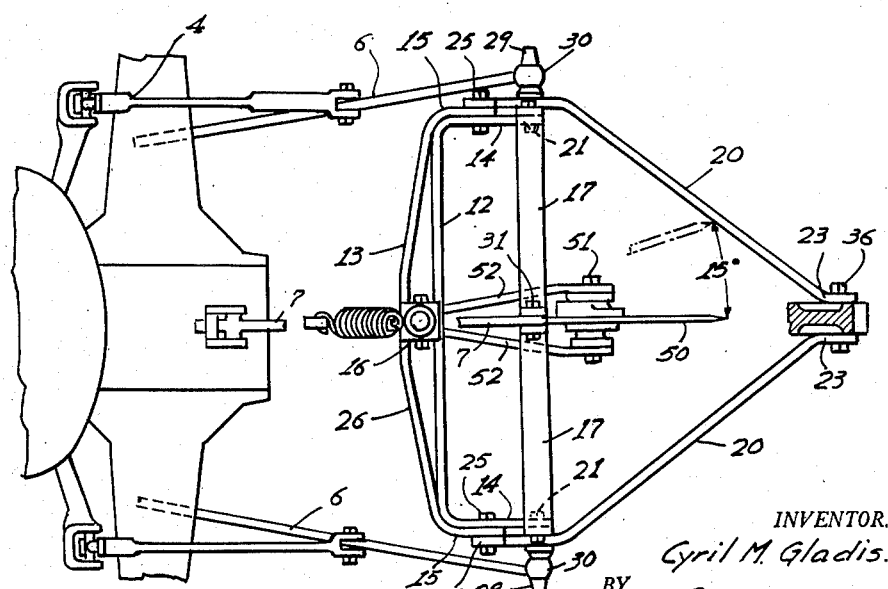
Fig. 2 is a plan view of the apparatus shown in Fig. 1.

Referring to Figs. 1 and 2 of the drawings, the numeral 1 designates, as a whole, a supporting framework for connecting a ground-engaging tool 2 to a tractor 3, only a portion of the rear of the tractor being illustrated. The tractor 3 is provided with a conventional linkage system 4 for hitching the frame 1 or other implements thereto. The frame 1 also mounts a swivelling and vertically adjustable colter designated as a whole by the numeral 5.

The linkage system 4 is conventional and comprises a pair of laterally spaced draft bars 6 and a compression bar 7 having universal connections at their inner ends for connection to the tractor 3, and universal connections at their outer ends for connection to the frame 1. Lifting arms 8 mounted on rock shafts 9 have universal connections at their outer ends to operating links 10. The lower ends of the operating links 10 have universal connections to the draft bars 6 for raising and lowering the same to and from the position shown in solid and broken lines in response to rotation of the lifting arms 8. The structure and operation of the linkage system 4 is conventional and provides what is known in the farm tractor field as a three-point tractor hitch.

The frame 1 is formed of a pair of transversely extending flat bars 12 and 13 having their outer ends 14 and 15 turned rearwardly and preferably welded together. The center portions of the bars 12 and 13 are spaced from each other by vetically spaced plates 16 which are welded thereto. The plates 16 are provided with aligned openings for a purpose to be described. As best shown in Fig. 3, a pair of flat metal bars 17 have their lower ends respectively bolted at 18 to the ends 14 of the cross member 12, the upper portions of the flat bars 17 converging to provide a vertically extending bracing fork having spaced upper ends 19 at the apex of its fork for a purpose to be described. As best shown in Fig. 2, a pair of flat metal bars 20 have their inner ends bolted as at 21 to the depending ends 22 of the straps 17, the trailing portions of the bars 20 converging to provide a horizontal bracing fork having spaced outer ends 23 at the apex of the fork for a purpose to be described. The inner ends 24 of the bars 20 are curved upwardly as best shown in Fig. 1 and have bolts 25 passing through the ends 14 and 15 of the members 12 and 13 which provide a connection therebetween. This arrangement provides a rigid framework comprised of a transversely extending draft beam 26, a vertically extending fork 27, and a horizontally extending fork 28.

The bolts 21 connecting the lower ends 22 of the vertical fork 27 with the inner ends of the horizontal fork 28 have outwardly extending spindles 29 on which the universal connections 30 at the ends of the draft bar 6 are mounted. In this manner, the spindles 29 provide draft connections for the frame 1 to the draft bars 6.

The upper end of the compression bar 7 is positioned between the upper ends 19 of the vertical fork 27 and a pivot pin 31 provides a pivotal connection therewith.

As best shown in Figs. 1 and 5, the implement 2 has a substantially semi-circular or crescent shape which is comprised of an upper section 32 and a lower section 33, the concave edge 34 of the lower section 33 being a cutting edge as will presently be described. Actually, the implement 2 has the shape of a scimitar, the lower section 33 having a larger radius of curvature than the upper section. As shown in Fig. 5, the implement 2 has an opening 35 between the sections 32 and 33. A pivot pin 36 passes through the opening 35 and provides a connection for the implement 2 with the outer ends 23 of the horizontal fork 28. The pin 36, in effect, provides a fulcrum for the implement 2. The upper end of the implement 2 is provided with an opening 37. A pin 38 passes through the opening 37 and pivotally connects the upper end of the implement 2 with upper ends 19 of the vertically extending fork 27 as best shown in Fig. 3. It will thus be seen that the implement 2 has a two-point connection at 36 and 38 to the frame 1, the two points of connection being respectively at the apex of the horizontal fork 28 and at the apex of the vertical fork 27. The connection at 36 is a draft connection by which the pulling force for drawing the implement 2 through the ground is applied thereto.

The connection at 36 also provides a fulcrum by which the reaction due to the movement of the lower section 33 through the ground is transmitted to the upper section 32, this force tending to rotate the implement 2 about the pivot 36 in a counterclockwise direction as viewed in Fig. 1. The reactive force is applied through the connection 38 to the upper end of the horizontal fork 27 which transmits this force directly to the compression link 7. It will thus be seen that the reactive force due to the movement of the lower section 33 through the ground is not transmitted through the body of the frame 1, and the flat bars 20 are not subjected to any substantial bending moments, the bars 20 being subjected only to tension forces due to the pulling action of the draft bar 6.

By reason of the crescent shape of the implement 2, it will be noted that the draft connections 29 of the frame 1, as viewed in Fig. 1, are aligned with a vertical line extending between the uper and lower ends of the implement 2. The connection 38 at the upper end of the beam 2 is positioned midway between and vertically above the draft connections 29. The connection or fulcrum 36 at the center of the chisel 2 is located in a horizontal plane containing the connections 29 and also midway therebetween. Since the forks 27 and 28 providing the connections 36 and 38 are normal to each other, it will be seen that the chisel 2 and frame 1 form a triangulated structure which is not complicated and while light in weight affords a strong and rigid construction.

As best shown in Fig. 1, the frame fork 27 and rearwardly extending fork 28 provide a substantially triangularly arranged pivotal support for the crescent shaped chisel 2. Actuation of draft link lifting arm 8 to lower chisel 2 in regulation of depth of penetration into the ground causes clock-wise rotation of the frame 27 and yoke 28 supporting chisel 2 causing the ground penetration portion 42 thereof to advance towards the tractor. This action substantially lessens the lifting of the tractor wheels from the ground and materially increases the steerability of the tractor during such penetration of the ground by the chisel.

The lower section 33 of the implement 2 is provided with indicia for indicating the depth in inches it penetrates below the surface of the ground during a tilling operation. By suitable adjustment of the position of the lifting arm 8, the depth of cut of the implement 2 may be adjusted. In order to facilitate movement of the implement through the earth, its leading edge 34 is beveled to an angle of substantially 50° as will be clearly apparent upon reference to the showing of Fig. 6. It has been found that this angle is the best angle to enable the implement to shear through the soil with the least amount of draft possible, it being noted that the portion of the chisel above its lower end 40 is not intended to work the earth. Referring further to the showing of Fig. 6, it is to be noted that the shape of the implement 2 in cross-section is essentially that of an arrow and that the flanks of the leading edge 34 extend to a greater breadth than the trailing edge of the section. It has been found that reducing the width of the trailing edge in this manner reduces the draft necessary to pull the implement through the earth. The lower end 40 of the section 33 is provided with an opening 41 through which a fastening connection may be passed for securing an earth working tool 42 of Fig. 1 thereto. The earth working tool 42 may be of any construction suitable to the condition of the earth to be worked. From the detailed showings of Figs. 5 through 8, it will be noted that the structure of the implement 2 is such that it may be fabricated readily by a forging operation from a straight bar having a cross sectional contour or area similar to that shown in Fig. 7.

Although the earth shearing edge 34 has been described as being integral with the body of the implement 2, it will be understood that such leading or shearing edge may be provided by a tool attached thereto. Fig. 9 shows a modification in which the entire earth cutting action is provided by a tool 45 secured to the leading edge of the implement 2 by a pair of bolts 46.

The colter 5 comprises a colter wheel 50 for cutting sod in advance of the path of movement of the implement section 33 to thereby reduce the draft necessary to pull the implement through the soil. The colter wheel 50 is rotatably supported by a shaft 51 carried by the outer ends of a pair of bars 52. The bars 52, as best shown in Fig. 4, have a central pivotal connection at 53 to the lower end of a vertical stem 54. The outer ends 55 of the bars 52 have a connection to one end of a spring 56 which has its other end connected with a hook 57 secured to a cap 58 on the upper end of the stem 54. The spring 56 resiliently biases the movement of the bars 52 in a clockwise direction about the pivot 53 to thereby resiliently force the cutting edge of the colter 50 into the ground through which the implement 2 may be moved. To vary the biasing effect of the spring 56, a set screw 59 is provided. Rotation of the set screw 59 varies the axial position of the cap 58 on the stem 54 and thereby the tension on the spring 56.

To mount the colter 5, the stem 54 is passed through aligned openings in the spaced plates 16 welded in position centrally of the frame bars 12 and 13. Its vertical position with respect to the frame 1, and thereby the cutting depth of the wheel 50, is controlled by a clamping ring 60 positioned between the plates 16 and encircling the stem 54. A set screw 61 is provided for clamping the ring 60 to the stem 54 so that engagement of the axial ends of the ring 60 with the plates 16 will limit axial movement of the stem 54 with respect to the plates 16. The clamping ring 60 and pin 54 are rotatable with respect to the plate 16 so that the colter may swivel in its movement over the ground. The transverse bar 13 is provided with an opening 62 through which the set screw 61 extends, the opening 62 being elongated in a horizontal direction so that free swivelling movement of the stem 54 may be had. Attention is directed to the fact that the mounting of the colter as provided by the stem 54 is such that the resilient action of the spring 56 on the colter, and variations in this resilient force due to movement of the colter wheel over rocks and the like will not be transmitted to the frame 1. It will also be noted that the vertical position of the entire colter assembly 5 may be adjusted with respect to the frame 1 by loosening the set screw 61 without varying the effective biasing force of the spring 56. Moreover, the entire colter assembly may be removed simply by operating the set screw 59 to reduce the tension of the spring 56 so that the cap 58 may be removed, and thereafter loosening the set screw 61 so that the stem 54 may be lowered vertically and withdrawn from the clamping ring 60.

From the showing of Fig. 1, it will be noted that the crescent shape of the implement 2 provides space in which the swivelling movement of the colter wheel 50 takes place. In this respect, attention is directed to the fact that the axis of shaft 51 on which the wheel 50 rotates is positioned inwardly of the ends of the implement 2, and the earth working tool 42 is positioned directly underneath the wheel 50 with the cutting edge shearing the earth at a point adjacent the cutting periphery of the wheel 50. From Fig. 1, it will be seen that the major portion of the wheel 50 is contained in the space between the concave surface 34 of the tool 2 and a line extending between its upper and lower ends.

While the axis of the pin 36 extending through opening 35 has been described as a fulcrum opening, it is to be understood that the designation of the pin 36 as a fulcrum has been adopted to facilitate explanation of the operation of the apparatus. Actually, there need be little or no noticeable pivotal movement of the implement 2 about the axis of the pin 36, it being sufficient that the reactive force of the earth on the lower section 33 of the implement 2 be transmitted directly through the upper section 32 to the compression link 7. In this respect, the bypassing of the frame 1 in the transmission of such reactive forces to the link 7 eliminates bending of the frame 1. Accordingly, it will be seen that the only forces transmitted by the frame 1 is the pulling force of the draft bars 6 as applied to the bars 20, this force being substantially entirely in tension, and a reactive force on the bars 17 due to the angular relation of the links 6 and bars 28, and of the compression link 7 relative to the implement 2. From this, it will be apparent that the provision of the implement 2 with a direct connection to the compression link 7 at 38 and with a fulcrum connection to the frame at 36 is effective to eliminate bending moments on the frame and thereby enables a much lighter and more durable frame construction than would otherwise be possible.

While the apparatus described above and shown in the drawings represents a preferred embodiment of the invention, it will be understood that this is merely by way of illustration, and that various changes and modifications may be made therein within the contemplation of the invention and under the scope of the following claims.

I claim:

1. A mounting for a deep tillage earth working implement to be attached to a tractor by a conventional three-point hitch having laterally spaced vertically swinging side links and a vertically pivoting top link, comprising an inverted substantially Y-shaped frame having depending transversely spaced arms and an upwardly extending stem portion, a substantially V-shaped member having converging arms, one of the ends of which are connected with the lower ends of said spaced frame arms and the opposite ends of the arms converging rearwardly therefrom, a vertically disposed substantially crescent shaped beam having its upper end connected to the stem of said frame and its intermediate portion connected to the ends of the converging arms of the V-shaped member, and an earth penetrating member at the bottom of said beam, said hitch top link being connected with the stem of said frame and said traction hitch side links having a common connection with said depending frame arms and V-shaped member arms.

2. The mounting as defined in claim 1 wherein a brace member is disposed within the said frame between the depending arms and connected thereto, said frame brace having a portion extending forwardly of the said frame.

3. The earth working implement as in claim 2 wherein the frame brace member has a shaft mounted thereon intermediate the ends thereof, a spring biased lever pivotally mounted intermediate its ends on the shaft for vertical pivotal movement between the frame side members and having an end portion extending rearwardly of the frame members, and a colter rotatably journaled on the rearwardly extending lever end portion.

4. The earth working implement as in claim 3 wherein the shaft is mounted on the frame brace member for rotative and vertical movement relative thereto.

References Cited in the file of this patent

UNITED STATES PATENTS

| 636,342 | Lambert | Nov. 7, 1899 |
| 639,356 | Campbell | Dec. 19, 1899 |
| 1,136,172 | Scott | Apr. 20, 1915 |
| 1,269,042 | Beeghley | June 11, 1918 |
| 2,456,693 | Fraga | Dec. 21, 1948 |
| 2,569,556 | Collins, et al. | Oct. 2, 1951 |
| 2,590,399 | Gilbert | Mar. 25, 1952 |
| 2,673,510 | Bailey | Mar. 30, 1954 |
| 2,698,492 | Justice | Jan. 4, 1955 |

FOREIGN PATENTS

| 66,113 | Germany | Dec. 17, 1892 |
| 449,328 | Germany | Sept. 13, 1927 |
| 641,744 | Great Britain | Aug. 16, 1940 |

OTHER REFERENCES

"Farm Implement and Machinery Review," Feb. 1, 1949, volume 74, No. 886, pages 1074 and 1075.